(12) United States Patent
Holdampf et al.

(10) Patent No.: US 6,702,385 B2
(45) Date of Patent: Mar. 9, 2004

(54) HEAD RESTRAINT PIVOT LATCH

(75) Inventors: Carl J. Holdampf, Farmington Hills, MI (US); Louis W. Smoltz, South Lyon, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/364,780

(22) Filed: Feb. 11, 2003

(65) Prior Publication Data

US 2003/0178881 A1 Sep. 25, 2003

Related U.S. Application Data

(60) Provisional application No. 60/356,564, filed on Feb. 11, 2002.

(51) Int. Cl.$^7$ ................................ B60N 2/48
(52) U.S. Cl. ...................................... 297/408
(58) Field of Search ................ 297/403, 408; 403/93, 94, 96, 97, 98

(56) References Cited

U.S. PATENT DOCUMENTS

| | | | |
|---|---|---|---|
| 3,174,499 A | 3/1965 | Mott | |
| 3,304,120 A | 2/1967 | Cramer | |
| 3,547,486 A | 12/1970 | Herzer et al. | |
| 3,550,958 A | 12/1970 | Krein | |
| 3,603,642 A | 9/1971 | Laessker | |
| 3,695,699 A | 10/1972 | Mertens | |
| 4,109,320 A | * 8/1978 | Anderson | 2/10 |
| 4,113,310 A | 9/1978 | Kapanka | |
| 4,266,760 A | 5/1981 | Matsui et al. | |
| 4,576,411 A | 3/1986 | Kitamura | |
| 4,596,403 A | 6/1986 | Dieckmann et al. | |
| 4,600,240 A | 7/1986 | Suman et al. | |
| 5,168,601 A | * 12/1992 | Liu | 16/445 |
| 5,346,282 A | * 9/1994 | De Filippo | 297/395 |
| 5,520,474 A | * 5/1996 | Liu | 403/97 |
| 5,669,668 A | 9/1997 | Leuchtmann | |
| 5,806,933 A | 9/1998 | Tsui et al. | |
| 6,050,633 A | 4/2000 | Droual | |
| 6,129,421 A | 10/2000 | Gilson et al. | |
| 6,302,485 B1 | 10/2001 | Nakane et al. | |
| 6,317,930 B1 | * 11/2001 | Hung | 16/430 |
| 6,612,653 B2 | * 9/2003 | Takata | 297/408 |
| 6,616,235 B1 | * 9/2003 | Khavari et al. | 297/408 |

FOREIGN PATENT DOCUMENTS

JP         05329032 A   * 12/1993  ............ A47C/7/38

* cited by examiner

*Primary Examiner*—Peter M. Cuomo
*Assistant Examiner*—Stephen D'Adamo
(74) *Attorney, Agent, or Firm*—Clark Hill PC

(57) ABSTRACT

A head restraint pivot latch for a seat assembly allowing pivotal adjustment of a head restraint relative to a seat back. A base member is pivotally assembled to the seat back allowing movement of the head restraint between a use position and a folded position. A first bracket having an index slot is fixedly assembled to the base member. A second bracket having a locking slot defining the use position extends between a proximal end pivotally assembled to the base member and a distal end fixedly secured to the seat back. A button having a tang and a tang slot is movable between the use position, with the tang extending through both the index slot of the first bracket and the locking slot of the second bracket, and a released position with the second bracket slidably engaged within the tang slot, allowing pivotal movement of the head restraint between the two positions.

17 Claims, 3 Drawing Sheets

HEAD RESTRAINT PIVOT LATCH

This application claims benefit of provisional application No. 60/356,564 filed Feb. 11, 2002.

BACKGROUND OF THE INVENTION

1. Field of the Invention

The invention relates to a head restraint for a seat assembly in an automotive vehicle, and more particularly, to a pivot latch for allowing the head restraint to fold into the occupant seating area to clear a driver's rearward visibility.

2. Description of Related Art

Automotive vehicles typically include front and rear seat assemblies arranged in rows for supporting occupants within the vehicle. Each seat assembly includes a seat cushion and a seat back for supporting the back of an occupant seated on the seat cushion. A seat assembly commonly includes a head restraint mounted on the seat back for supporting the head of the occupant.

A growing number of countries are requiring vehicle manufacturers to produce seats with increased seat back heights to provide increased protection against whiplash. However, increasing the height of seat backs in rear seat assemblies results in reduced, or otherwise obstructed, rearward visibility for front seat occupants, more particularly, for the driver.

Therefore, it is desirable to have a head restraint pivot latch coupled between the seat back and head restraint for allowing selective locking of the head restraint between an upright use position and a folded position to improve rearward visibility for the driver when the seats are not in use.

SUMMARY OF THE INVENTION

According to one aspect of the invention, there is provided a latch for allowing selective pivotal adjustment of a head restraint relative to a seat back. The latch comprises a base member supporting the head restraint and pivotally assembled to the seat back allowing movement of the head restraint between a use position and a folded position. A first bracket is fixedly secured to the base member and includes an index slot for defining the use position of the head restraint. A second bracket having a locking slot defining the use position of the head restraint extends between a proximal end pivotally assembled to the base member and a distal end adapted to be fixedly secured to the seat back. A release member having a tang is operatively assembled to the base member for movement between an unreleased position, with the tang extending through both the index slot of the first bracket and the locking slot of the second bracket to maintain the head restraint in the use position, and a released position wherein the tang is disengaged with the locking slot to allow pivotal adjustment of the head restraint between the use position and the folded position.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
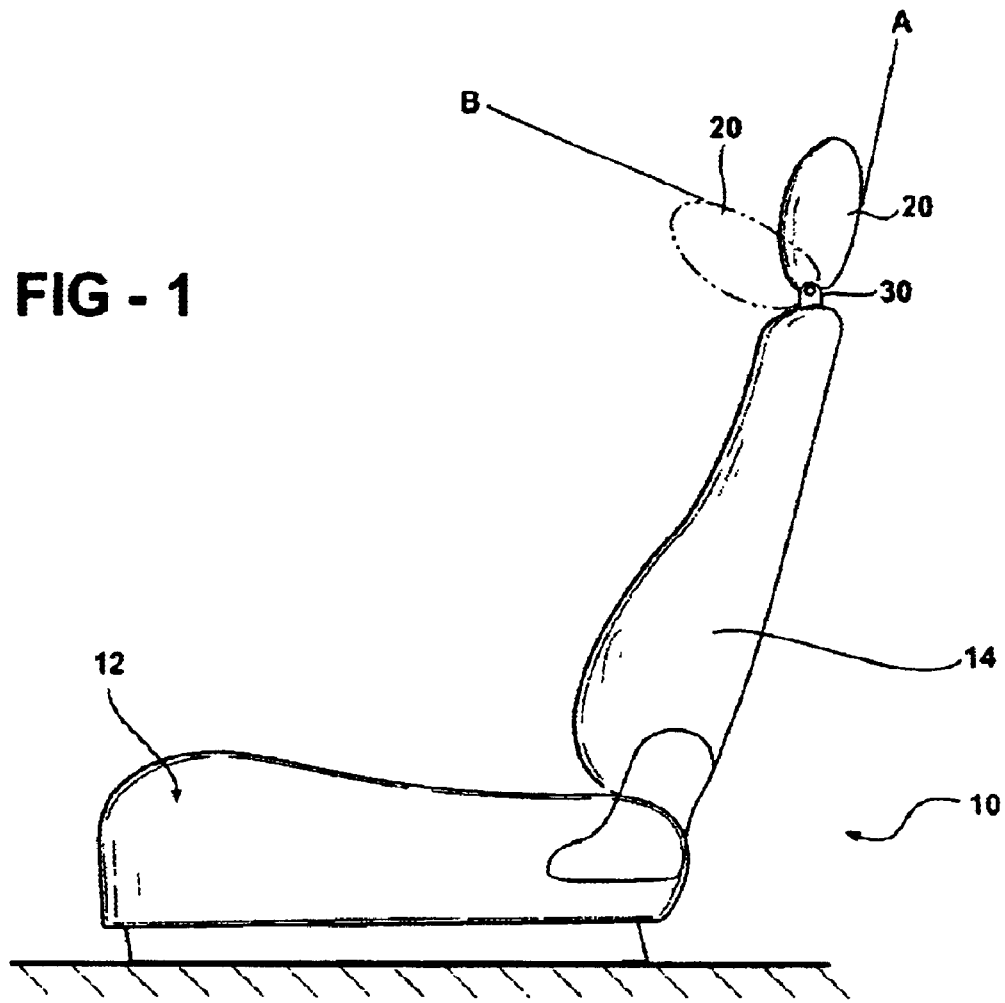
FIG. 1 is a schematic view of a seat assembly incorporating a head restraint pivot latch according to the present invention.

Referring to the figures, FIG. 1 shows a vehicle seat assembly 10 incorporating a head restraint pivot latch 30 according to the invention. The seat assembly 10 includes a seat cushion 12 for supporting a seated occupant and a seat back 14 for supporting the back of the occupant. The seat assembly 10 also includes a head restraint 20 operatively connected to the top of the seat back 14 for supporting the head of the occupant. The head restraint 20 is operatively connected to the seat back 14 by a pivot latch 30. Described in greater detail below, the pivot latch 30 allows for selective pivotal movement of the head restraint 20 between a generally upright use position A and a folded position B against the seat back 14.

Figure 2:
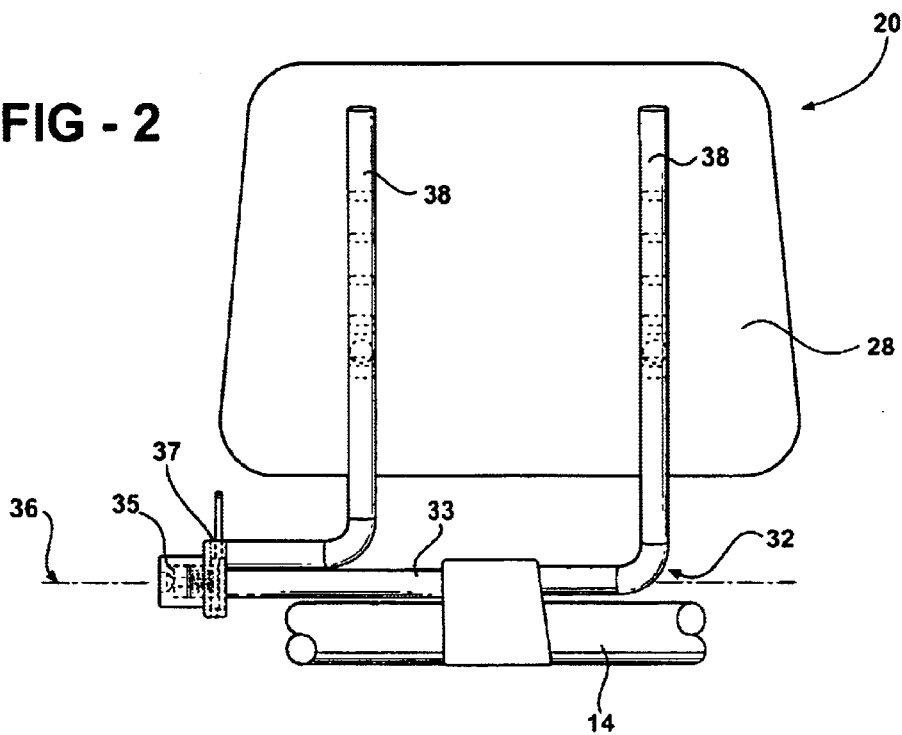
FIG. 2 a front view of the head restraint pivot latch.

Referring to FIG. 2, the pivot latch 30 includes a frame 32 for supporting a padded member 28 of the head restraint 20. The frame 32 has a cylindrical base member 33 pivotally assembled to the seat back 14 for movement about a pivot axis 36. The base member 33 presents a terminal end 35 having an annular recess or notch 37 formed therein. The base member 33 also includes a pair of spaced apart and parallel guide posts 38 extending vertically from the base member 33. The padded member 28 of the head restraint 20 is slidably mounted to the guide posts 38 for providing height adjustment relative to the seat back 14.

Figure 3:
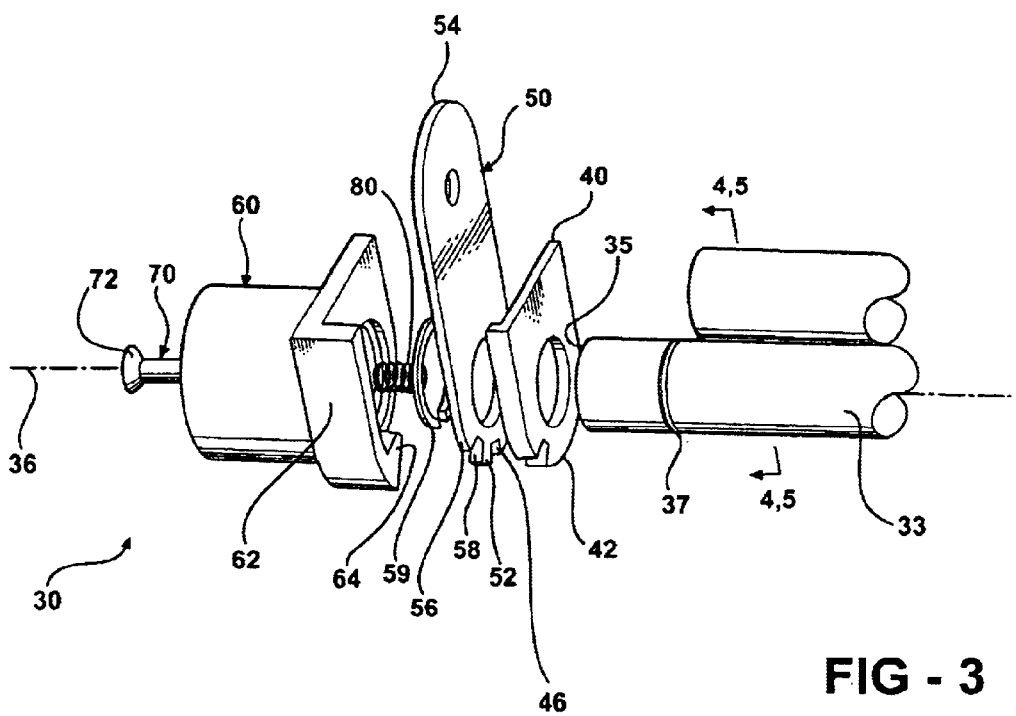
FIG. 3 is an enlarged, exploded view of the head restraint pivot latch.

As best shown in FIG. 3, the pivot latch 30 includes a first bracket 40 fixedly assembled to the base member 33, by welding or other suitable means, for movement therewith. The first bracket 40 has an arcuate first guide surface 42 centered about the pivot axis 36. An index slot 44 is formed in the first guide surface 42. A second bracket 50, extending between proximal and distal ends 52, 54, interconnects the base member 33 and the seat back 14. The proximal end 52 of the second bracket 50 is pivotally assembled to the base member 33 and positioned axially between the annular recess 37 and the first bracket 40. The distal end 54 of the second bracket 50 is adapted to be fixedly secured to the seat back 14 by any suitable means, such as with a bolt or by welding. The second bracket 50 includes an arcuate second guide surface 56 centered about the pivot axis 36, and corresponding to the first guide surface 42 of the first bracket 40. A locking slot 58 is formed in the second guide surface 56, defining the use position A of the head restraint 20. When the head restraint 20 is in the use position A, the locking slot 58 is radially aligned with the index slot 44. The pivot latch 30 further includes a retainer ring 59 seated in the annular recess 37 for axially retaining the second bracket 50 between the retainer ring 59 and the first bracket 40.

Figure 4:
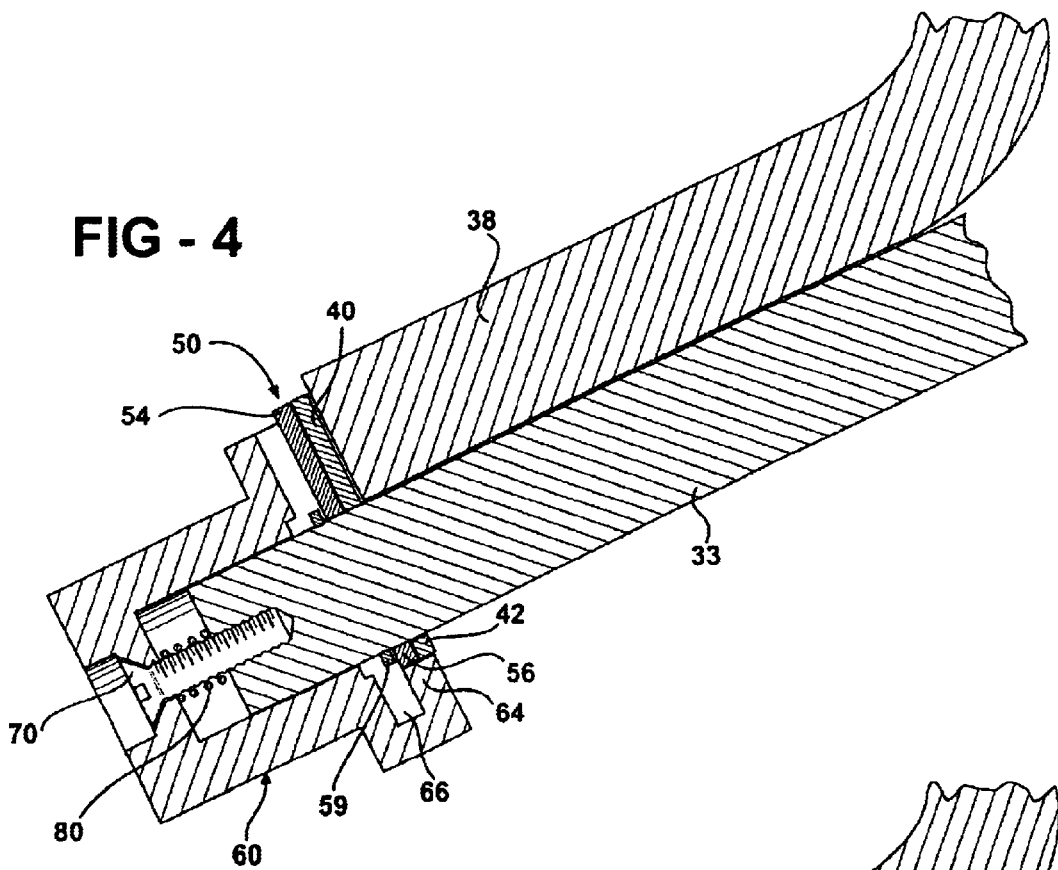
FIG. 4 is a partial cross sectional view of the head restraint pivot latch in the use position.
Figure 5:
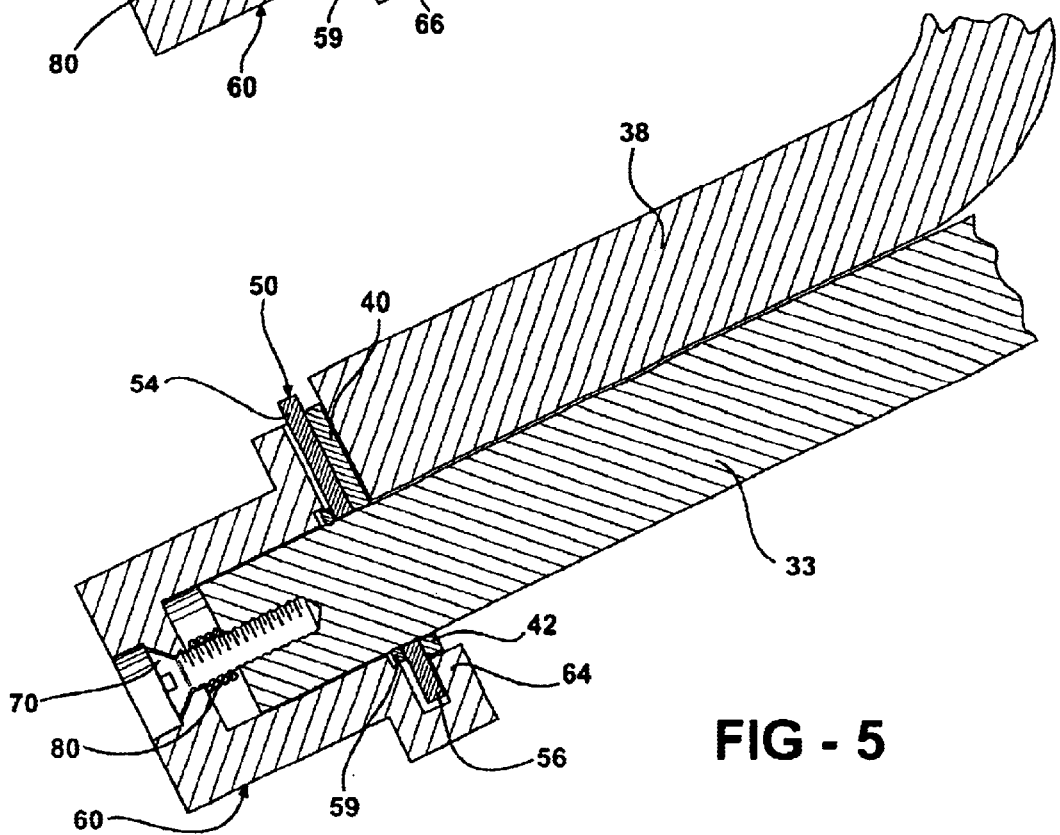
FIG. 5 is a partial cross sectional view of the head restraint pivot latch in the folded position.

The pivot latch 30 further includes a release member, specifically a button 60, slidably engaged with the terminal end 35 of the base member 33 for axial movement between a released position and an unreleased position. The button 60 includes an arcuate flange 62 and a tang 64 extends radially inwardly from the flange 62 for mating engagement with the index slot 44 and the locking slot 58. The tang 64 includes a tang slot 66, as best shown in FIGS. 4 and 5, for slidably engaging the second guide surface 56 during rotation of the head restraint 20 between the use position A and the folded position B. A fastener, specifically a bolt 70, protrudes axially from the terminal end 35 of the base member 33 and through the button 60 presenting an abutment end, specifically a bolt head 72. A biasing member 80 compressed between the terminal end 35 and the button 60, biases the button 60 against the bolt head 72 defining the unreleased position.

In operation, the tang 64 extends through or is seated in both the index slot 44 and the locking slot 58 when the head restraint 20 is in the use position A. The tang 64, while engaged with the index slot 44 and the locking slot 58, locks the first bracket 40 relative to the second bracket 50 to maintain the head restraint 20 in the use position A. To move the head restraint 20 between the use and folded positions A, B, the button 60 must be depressed from the unreleased position, FIG. 4, to the released position, FIG. 5. Upon pushing the button 60, the tang 64 slidably and axially moves toward the first bracket 40 until the second guide surface 56 of the second bracket 50 is slidably received within the tang slot 66 and the tang 64 is free from the locking slot 58, thereby unlocking the first bracket 40 from the second bracket 50. Once unlocked, the head restraint 20 may be rotated relative to the seat back 14 between the use and folded positions A, B. When the head restraint 20 is between the use and folded positions A, B, the second guide surface 56 of the second bracket 50 remains engaged with the tang slot 66, thereby maintaining the button 60 in the released position against the force of the biasing member 80. To return the head restraint to the use position A, the head restraint 20 is rotated towards the use position A and when the index slot 44 and the locking slot 58 are in alignment, the force of the biasing member 80 causes the button 60 to slidably move away from the first bracket 40 as the second bracket 50 simultaneously disengages from the tang slot 66 and the tang 64 re-enters the index slot 44, thereby locking the first bracket 40 to the second bracket 50 to again retain the head restraint 20 in the use position A. It should be appreciated by those skilled in the art that, as shown by intermediate slot 68 in FIG. 3, any number of slots may be formed in the second guide surface 56 of the second bracket 50, thereby defining intermediate positions of the head restraint 20 between the use and folded positions.

In a first alternate embodiment of the pivot latch 30, the distal end 54 of the second bracket 50 may be adapted to be interconnected to a self-aligning head restraint mechanism. The self-aligning head restraint mechanism allows the head restraint 20 to automatically pivot relative to the seat back 14 in response to pivotal movement of the seat back 14 relative to the seat cushion 12 while the button 60 remains in the unreleased position. An example of such a self-aligning head restraint mechanism can be found in pending PCT patent application PCT/US01/28269 filed on Sep. 10, 2001, which is incorporated herein by reference in its entirety.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A latch for providing selective pivotal adjustment of a head restraint relative to a seat back, said latch comprising:
   a base member pivotally coupled to the seat back for supporting the head restraint and providing movement of the head restraint between a use and folded positions;
   a first bracket fixedly secured to the base member and including an index slot defining the use position of the head restraint;
   a second bracket having a locking slot defining said use position of the head restraint and wherein said second bracket extends between a proximal end pivotally assembled to said base member and a distal end adapted to be fixedly secured to the seat back;
   a release member having a tang lockingly engagable with both of said locking slot and said index slot to maintain the head restraint in the use position, said release member is movably coupled to said base member for movement between an unreleased position, where said tang is lockingly engaged with both of said locking slot and said index slot, and a released position wherein said tang is disengaged from said locking slot to allow pivotal movement of said head restraint between the use and folded positions.

2. A latch as set forth in claim 1, wherein said base member is a cylindrical shaft defining a pivot axis, said base member being pivotally movable about said pivot axis.

3. A latch as set forth in claim 2, wherein said first bracket has an arcuate first guide surface centered about said pivot axis.

4. A latch as set forth in claim 3, wherein said second bracket has an arcuate second guide surface centered about said pivot axis and corresponding to said first guide surface of said first bracket.

5. A latch as set forth in claim 4, wherein said index slot of said first bracket is formed in said first guide surface.

6. A latch as set forth in claim 5, wherein said locking slot of said second bracket is formed in said second guide surface.

7. A latch as set forth in claim 6, wherein said release member further includes a tang slot for slidably receiving said second guide surface of said second bracket during movement of the head restraint between the use and folded positions.

8. A latch as set forth in claim 7, wherein said base member has a terminal end with an annular recess formed therein.

9. A latch as set forth in claim 8, further including a retainer ring engaging with said annular recess of said base member for axially retaining said second bracket between said retainer ring and said first bracket.

10. A latch as set forth in claim 9, wherein said release member further includes an arcuate flange for slidably engaging said second guide surface during rotation of the head restraint between the use and folded positions.

11. A latch as set forth in claim 10, wherein said tang of said release member extends radially inwardly from said flange.

12. A latch as set forth in claim 11, wherein said release member is slidably engaged with said terminal end of said base member for axial movement of said release member between the unreleased position and the released position.

13. A latch as set forth in claim 12, further including a fastener protruding axially from said terminal end of said base member and extending through said release member and presenting an abutment end.

14. A latch as set forth in claim 13, further including a biasing member compressed between said terminal end of said base member and said release member, for biasing said release member against said abutment end and thereby defining the unreleased position.

15. A latch as set forth in claim 1, wherein said base member further includes a pair of spaced apart guide posts extending vertically from said base member for supporting and providing height adjustment of the head restraint relative to the seat back.

16. A latch as set forth in claim 1, wherein said second bracket includes at least one intermediate slot thereby defining at least one intermediate position of the head restraint between the use and folded positions.

17. A latch for providing selective pivotal adjustment of a head restraint relative to a seat back, said latch comprising:

- a base member pivotally coupled to the seat back for supporting the head restraint and providing movement of the head restraint between a use and folded positions;
- a first bracket fixedly secured to the base member and including an index slot defining the use position of the head restraint;
- a second bracket having a locking slot defining said use position of the head restraint and wherein said second bracket extends between a proximal end pivotally assembled to said base member and a distal end adapted to be interconnected to a self-aligning head restraint mechanism for allowing the head restraint to automatically pivot relative to the seat back in response to pivotal movement of the seat back relative to the seat cushion;
- a release member having a tang lockingly engagable with both of said locking slot and said index slot to maintain the head restraint in the use position, said release member is movably coupled to said base member for movement between an unreleased position, where said tang is lockingly engaged with both of said locking slot and said index slot, and a released position wherein said tang is disengaged from said locking slot to allow pivotal movement of said head restraint between the use and folded positions.

* * * * *